United States Patent
Krishna et al.

(10) Patent No.: US 8,949,530 B2
(45) Date of Patent: Feb. 3, 2015

(54) DYNAMIC INDEX SELECTION IN A HARDWARE CACHE

(75) Inventors: Mvv A. Krishna, Cary, NC (US); Shaul Yifrach, Haifa, IL (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 13/196,071

(22) Filed: Aug. 2, 2011

(65) Prior Publication Data

US 2013/0036271 A1 Feb. 7, 2013

(51) Int. Cl.
*G06F 12/08* (2006.01)

(52) U.S. Cl.
CPC ............ *G06F 12/08* (2013.01); *G06F 12/0864* (2013.01); *G06F 12/0895* (2013.01); *G06F 2212/601* (2013.01)
USPC .... 711/118; 711/128; 711/135; 711/E12.017; 711/E12.022

(58) Field of Classification Search
CPC . G06F 12/0864; G06F 12/08; G06F 12/0895; G06F 12/0846; G06F 2212/1021; G06F 2212/1028; G06F 2212/6082; G06F 12/123
USPC ........... 711/118, 128, 135, E12.022, E12.017
See application file for complete search history.

(56) References Cited

U.S. PATENT DOCUMENTS

| | | | |
|---|---|---|---|
| 2007/0126744 A1* | 6/2007 | Tsutsumi | 345/520 |
| 2008/0183663 A1 | 7/2008 | Day et al. | |

* cited by examiner

*Primary Examiner* — Jasmine Song
(74) *Attorney, Agent, or Firm* — H. Daniel Schnurmann; Jeffrey L. Streets (57) ABSTRACT

Systems and methods are disclosed for improving the performance of cache memory in a computer system by dynamically selecting an index for caching main memory while an application is running. A disclosed example of a memory system includes a cache including a data array, a primary tag array, and at least one secondary tag array. A currently selected index is used to index data bits to the data array and tag bits to the primary tag array. The performance of at least one candidate index is evaluated by indexing tag bits to the secondary tag array, without caching any data using the candidate index while the candidate index is under evaluation. If the candidate index has a better hit rate than the currently selected index, the memory system switches to using the candidate index to cache data.

5 Claims, 6 Drawing Sheets

DYNAMIC INDEX SELECTION IN A HARDWARE CACHE

BACKGROUND

1. Field of the Invention

The present invention relates to computer memory systems, and in particular to optimizing the performance of a hardware cache.

2. Background of the Related Art

A memory cache is a computer system component that stores small amounts of instructions and/or data for faster read/write access than provided by larger memory components such as system RAM (random access memory) or a hard disk drive. For example, Level 1 (L1) and Level 2 (L2) cache store data and instructions on behalf of system RAM for fast access by the processor. L1 cache has less storage capacity than L2 cache and is typically built directly into the processor. L1 cache can run at the same speed as the processor, providing the fastest possible access time. L2 cache is typically separate from the processor but provided within the same chip package as the processor. Despite being slower than L1 cache, L2 cache generally has more storage capacity than L1 cache and is still much faster than main memory.

L1 cache typically includes an instruction cache and a data cache. An L1 instruction cache contains a copy of a portion of the instructions in main memory. An L1 data cache contains a copy of a portion of data in main memory, but some designs allow the data cache to contain a version of the data that is newer than the data in main memory. This is referred to as a store-in or write-back cache because the newest copy of the data is stored in the data cache and because it must be written back out to memory when that cache location is needed to hold a different piece of data or is otherwise flushed.

Some systems having multiple processors (or processor cores) include a separate L1 cache for each processor, but share a common L2 cache. This is referred to as a shared L2 cache. Because a shared L2 cache may have to handle several read and/or write operations simultaneously from multiple processors and even from multiple threads within the same physical processor, a shared L2 cache is usually more complex than an L2 cache dedicated to a single processor.

Cache memory may be mapped to the main memory in a variety of ways. Examples of cache mapping known in the art include direct-mapped cache, fully associative cache, and N-way set-associative cache. Direct mapping involves logically dividing main memory according to the number of cache lines provided, so that each logical division of main memory shares a particular cache line. At the other end of the spectrum, fully associative cache allows any cache line to store the contents of any memory location in main memory. N-way set-associative cache involves a compromise between direct mapping and fully-associative mapping, wherein the cache is divided up into multiple "sets" that each contain some number of cache lines (alternately referred to as "ways"). Typically, set-associative cache structures contain 2, 4 or 8 ways per set. A particular memory address is placed into one and only one set, but can be held in any one of the ways within that set.

SUMMARY

A disclosed memory system includes a cache having a data array for caching data bits of memory blocks and at least one tag array for caching tag bits associated with the cached data bits. A cache controller includes control logic for indexing tag bits to the at least one tag array using each of a plurality of different indexes. Each index comprises a different subset of address bit positions. The cache controller further includes control logic for separately obtaining a hit rate for each index, control logic for dynamically selecting the index resulting in the best performance metric, e.g. the greatest hit rate, and control logic for indexing the data bits to the data array using the dynamically selected index.

A disclosed method for improving performance of cache memory in a computer comprises the computer running a software application that generates memory blocks to be stored in memory, and the cache controller indexing data bits of the memory blocks to a data array in the cache memory using a currently selected index. The cache controller indexes tag bits of the memory blocks to a tag array using a plurality of different indexes and obtains a hit rate for each index, and dynamically selects the index that produces the greatest hit rate.

DETAILED DESCRIPTION

Systems and methods are disclosed for dynamically selecting an index for caching main memory while an application is running. Various approaches are described for evaluating the performance of a plurality of indexes in terms of a performance metric, such as a hit rate in a particular cache, or some mathematical function of a hit rate (e.g. a miss rate), and dynamically switching to the index having the best performance. The described methods are truly dynamic, in that the dynamic index selection and switching may be performed while the application generating memory blocks is running. Desirably, such methods can be implemented in hardware, wherein the control logic is set forth in firmware residing in the cache controller, without requiring intervention from the operating system or the running application. The disclosed systems have at least one data array for caching data and at least one tag array for caching associated tag bits used to identify a hit or miss on subsequent cache lookups. The data cached in the data array may refer to both application data and application software instructions to be executed in running the application.

A minimalist system may include only one tag array. The minimalist system may sequentially evaluate a series of different indexes by sequentially selecting different indexes to be evaluated, and caching to the data array and the only one tag array according to the currently selected index. A hit rate may be obtained for each index, and the system may then switch to the index having the greatest hit rate. The index having the greatest hit rate may change over time, so this process may be repeated periodically to update the determination of the index having the greatest hit rate under current operating conditions.

A preferred system includes at least one primary tag array and at least one secondary tag array. This allows for caching to the primary tag array and to the data array using a currently selected index, while one or more candidate indexes may be evaluated on the at least one secondary tag array. When the performance rate has been obtained for a candidate index, the system may then switch to the candidate index if the candidate index has a greater hit rate than the currently selected index (i.e. the candidate index becomes the currently selected index). If only one secondary tag array is included, then a plurality of different candidate indexes may be sequentially evaluated using the only one secondary tag array. If a plurality of secondary tag arrays is included, then a corresponding number of different candidate indexes may be simultaneously evaluated, each on a respective one of the secondary tag arrays.

Figure 1:
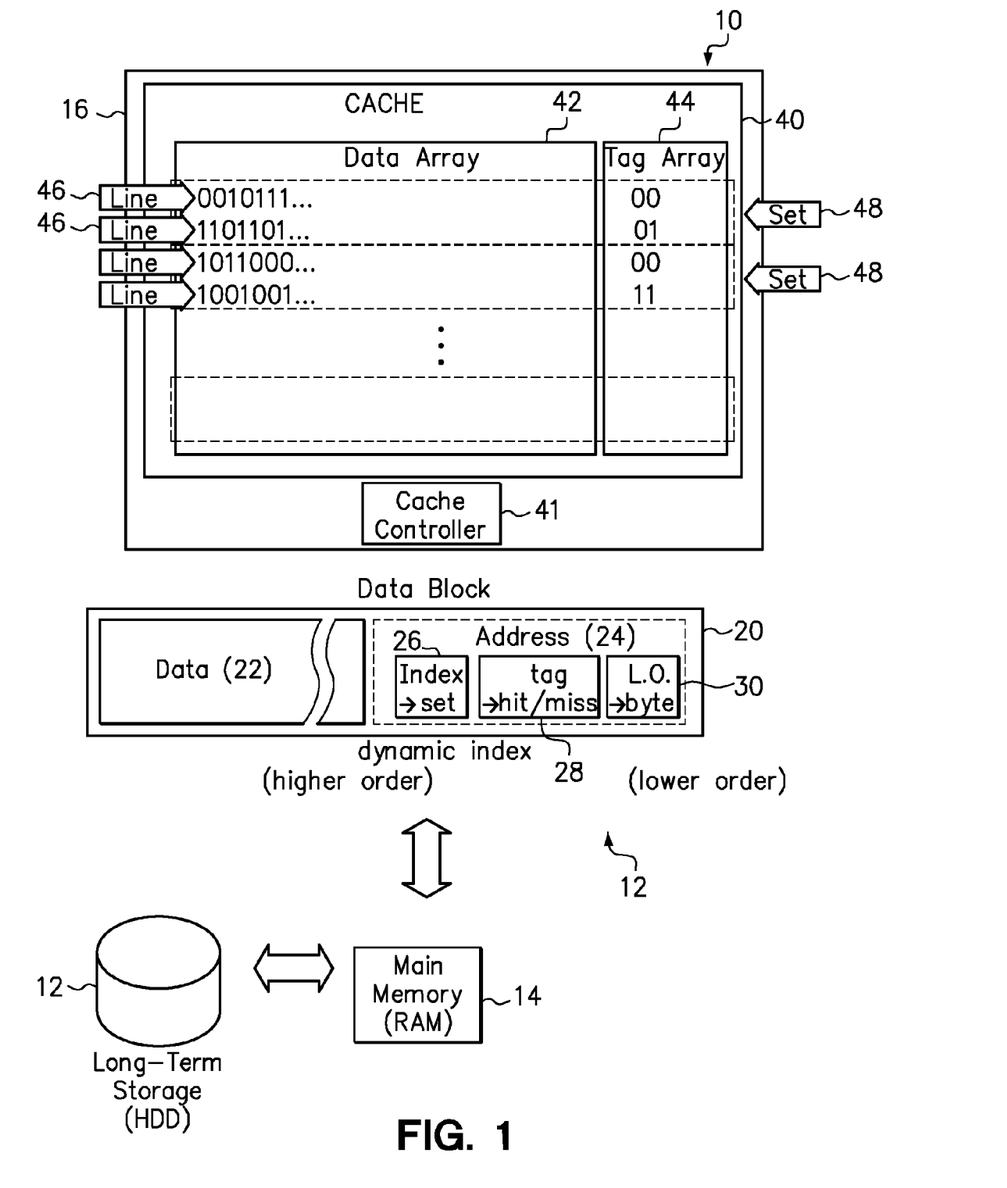
FIG. 1 is a schematic diagram of a memory system having a dynamically selected index for caching contents of main memory in a cache.

FIG. 1 is a schematic diagram of a memory system 10 having a dynamically selected index 26 for storing (i.e. caching) selected data from main memory 14 in a cache 40. Main memory 14 is a volatile memory component that stores data and software instructions associated with software applications for execution by a processor 16. The main memory 14 comprises random access memory (RAM), which may be embodied as one or more dual in-line memory module (DIMM) each having a plurality of dynamic random access memory (DRAM) chips. Main memory 14 is significantly smaller but faster to access than a typical long-term storage device, such as a hard disk drive (HDD) 12. When a software application is initiated, the software instructions and data associated with that application are loaded from long-term storage 12 into main memory 14, where a processor 16 may directly access the instructions and data. The cache 40 is even smaller but faster to access than main memory 14. Therefore, the speed of the memory system 10 is further improved by caching frequently accessed data and instructions from main memory 14 in the cache 40.

The cache 40 may include a hierarchy of cache elements (not shown), such as separate Level 1 (L1) cache located directly on each of one or more processor cores and a shared Level 2 (L2) cache within a chip package but separate from the processor core(s). Additional levels of on-chip, off-chip, or look-aside cache may also be included. When the processor 16 attempts to access instructions or data from main memory 14, the processor 16 is first directed to the cache 40 to determine if the desired instructions or data are located on the cache 40. In the case of multi-level cache, the processor 16 may first look to its local, L1 cache. If the sought instructions or data do not exist in the L1 cache, the processor 16 is next directed to the shared L2 cache. If the sought instructions or data are not located anywhere in the cache 40, the processor 16 will then obtain the instructions or data directly from the main memory 14. Control logic is included with a cache controller 41 to manage the storage and retrieval of memory in the cache 40. The processor 16 accessing main memory 14 does not need to know whether the accessed data and instructions currently reside in the main memory 14 or in the cache 40.

The cache 40 is visually enlarged in its schematic representation in FIG. 1 for illustrating selected features. Blocks from main memory 14 may be selectively cached in the cache 40 according to algorithms for preferentially caching data that is likely to be re-used again during execution of a software application. A block is a unit of memory storage comprising a sequence of bits and having a fixed block size. For example, the block 20 may have a block size of 64 bytes (B), wherein a byte consists of eight bits. A representative block 20 is diagramed as including data 22 and an address 24 for that block 20, wherein every block in main memory has a unique address. The cache 40 has a fixed number of cache lines 46 organized into sets 48 of one or more cache lines 46 per set 48. Each cache line 46 is a physical structure capable of receiving one block 20. The cache 40 is an N-way, set-associative cache, wherein the cache lines 46 are organized into sets 48 each having an equal number "N" of cache lines 46 (i.e. ways) per set 48. By way of example, FIG. 1 shows a 2-way set-associative cache, which may have 1024 sets 48 with two cache lines 46 associated with each set 48. Thus, up to 2048 blocks from main memory 14 may be cached at any one time.

The address bits 24 are used to determine where in the cache 40 the data from a particular block 20 is stored. The address 24 associated with the block 20 has a fixed bit length, such as 32 or 64 address bits. A first subset of the address bits 24 are used an index 26 to determine which set 48 the data 22 is written to. A second subset of the address bits 24 are tag bits 28 used to label (i.e. tag) the particular line 46. The tag bits 28 can be used to determine a "hit" or "miss" during a cache look-up. A third subset of address bits 24 comprising the lowest-order address bits 30 are used to specify a particular byte (set of eight bits). The index 26 maps (i.e. indexes) the blocks 20 in main memory 14 to the sets 48 in the cache 40, such that the block 20, if/when cached, will be stored somewhere in any one of the lines 46 within a specific set 48 to which that block 20 is indexed. In the example of an N-way, set-associative cache organized into 1024 sets, ten address bits are mathematically required for the index, because a bit can have one of two possible values (e.g. 0 or 1) and 10 bits are necessary to generate 1024 unique combinations of bit values ($1024=2^{10}$). The data stored in the cache 40 collectively form a data array 42, while the tag bits collectively form a tag array 44. Blocks having the identical sequence of index bit values are indexed to the same set 48. However, because the main memory 14 has a larger capacity than the cache 40 and may hold many more blocks 20 than the number of available cache lines 46 in the cache 40, the number of blocks 20 mapped to a particular set 48 is greater than the number of cache lines 46 in that set 48. Within the set of blocks 20 mapped to a particular set 48, however, each block has a unique set of tag bits 28. Thus, the index bits 26 determine the set where a block of data will be stored, and the tag bits 28 are used to determine the line (within the set) wherein the data will be stored.

The index bits 26 and the tag bits 28 are used in the process of writing to and reading from the cache 40. In writing a block 20 from main memory 14 to the cache 40, the index bits 26 from the associated address block 24 are used to determine which set 48 that the data 22 in the block 20 is to be written to. The data 22 may then be written to any one of the lines 46 within that set 48. A variety of algorithms known in the art may be used to select which cache line 46 within a particular set 48 that the data 22 is to be written to. Since each set 48 may have a limited number of cache lines 46, the particular cache line 46 where a block 20 is to be written may contain previously written data, such as outdated data from the same memory address or data from another memory address. In writing the block 20 to the selected line, the data bits for the block 20 are placed in the data array 42 within the selected cache line 46, and the associated tag bits 28 are placed in the tag array 44 within that same cache line 46. The tag bits 28 stored in the tag array 44 will be used to determine a hit or miss on a subsequent read.

In reading a block 20 from the cache 40, the index 26 is first used to determine which set 48 to look in based on the address 24 for that block 20. Applying the index thus narrows the search for requested data down to a particular set 48. Then, a "tag compare" is performed by comparing the tag 28 of the block being looked up to the bits in each line 46 of the tag array 44 within that set 48, to determine if the sought block is present in that set. A "hit" occurs if the tag bits are found in one of the cache lines 46 within that set 48. A "miss" occurs if the tag bits 28 are not found in that set 48. The number of hits obtained per cache lookup determines the hit rate. Note that the hit rate may be used as a performance metric directly by measuring the hit rate, or indirectly, e.g. by measuring a miss rate, which is a mathematical function of the hit rate. More complicated performance metrics that may be applied include, for example, a hit rate weighted by a criticality of an access or a hit rate weighted by the intended quality of service guarantees for an application. It is also possible to directly measure application performance in terms of Instructions Per Cycle.

A plurality of candidate indexes may be determined from among the address bits available for use as an index. The performance of the cache 40 is improved by dynamically evaluating the performance of different candidate indexes and selecting from among the candidate indexes in an effort to identify the index having the greatest hit rate. Generally, an index typically consists of some subset of higher-order address bits. However, the dynamic index 26 in this memory system 10 may be changed, even while an application is running, by selecting (e.g., using higher-order address bits or lower-order address bits) the address bits used as the index 26. The performance of each index may be evaluated by obtaining a hit rate for each index, either sequentially or concurrently, while the application is running over some period of time. As further discussed below, the hit rate for an index may depend on the bit order of the address bits used as the index, due to various factors such as software application dynamics that reuse some index values more often than others. Generally, between two candidate indexes, the better performing index will be the index resulting in more uniform distribution of data in the cache, when measured over a statistically meaningful period of time. An index that results in a disproportionately large number of cache accesses within a limited number of sets will generally have poor performance.

Figure 2:
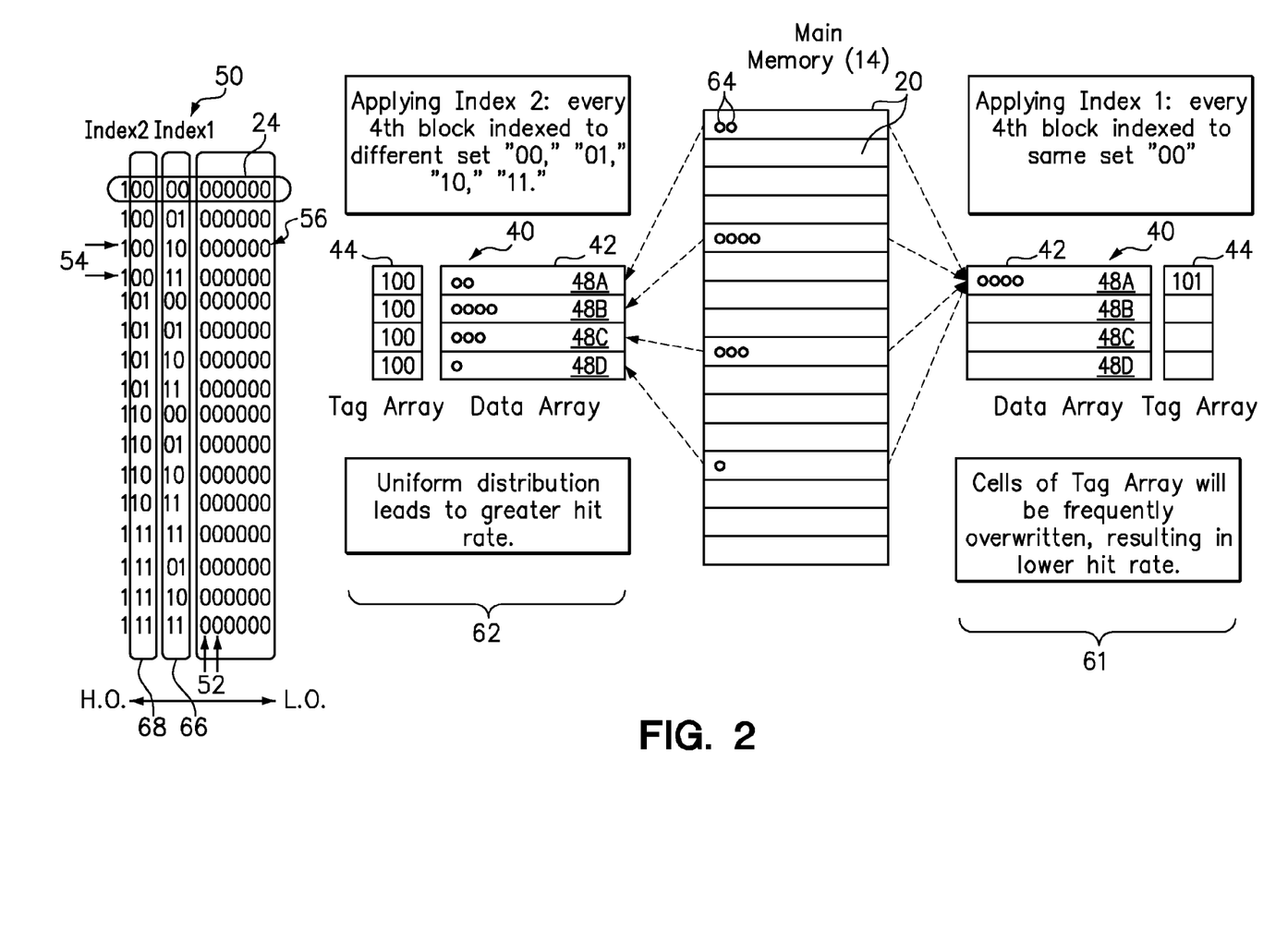
FIG. 2 is a schematic diagram illustrating a hypothetical difference in cache distribution between two competing indexes.

FIG. 2 is a schematic diagram illustrating the difference in cache distribution between two competing indexes. An address array 50 shown on the left side of FIG. 1 has columns 52 and rows 54, wherein each row 54 is the address 24 of a different block. A third grouping 56 of address bits is six bits wide, representing the byte address for a byte of data to be read or written. The address array 50 shows the full address of cache line sized blocks in memory. Assuming each cache line is 64 bytes, six address bits are needed to identify a specific byte address in the memory. However, since a cache only deals in cache line sized blocks with the memory, it just needs to point to the first byte of a 64 B block of memory. The first byte is "000000" in that third grouping 56 of address bits. Each column 52 represents a different bit position within the address. So, different indexes may be selected using different columns 52 of address bits in the array 50. Two example indexes 66, 68 are indicated by way of example. The first index 66 includes two columns 52 of address bits, and the second index 68 includes another two columns 52 of address bits, wherein the first index 66 consists of lower-order address bits than the second index 68. Although indexes 66, 68 do not have any columns 52 in common (i.e., their bit positions do not overlap), two different indexes may have as few as one unique column per index.

The main memory 14 is diagramed in FIG. 2 as a larger rectangle with individual rectangles representing the individual blocks 20. There is a one-to-one correspondence between the blocks 20 in main memory 14 and the entries in the Address Array 50. A first mapping 61 to the right of main memory 14 shows how the blocks 20 in main memory 14 would be mapped to the cache 40 (including the data array 42 and tag array 44) using the first index 66 (Index 1). A second mapping 62 to the left of main memory 14 shows how the blocks 20 in main memory 14 would instead be mapped to the cache 40 using the second index 68 (Index 2). In this simplified example, a statistically higher frequency of block accesses (indicated by circles in the blocks 20) occurs for every fourth block. Only a subset (e.g. the first few bytes) of each buffer is heavily accessed in certain program phases (shown with dots 64). The aggregation of dots 64 may represent, for example, that every 4th block in the main memory starts a new element of a software data structure, and that only the first few bytes of each element of that data structure are repeatedly used. The dots 64 represent the bytes that are accessed in those blocks of memory. This hypothetical situation illustrates how two different indexing schemes can lead to vastly different cache utilization, which is quite possible in a real embodiment of a memory system.

As illustrated in the first mapping 61, by applying the first index 66, all (or a disproportionately large number) of cache accesses in the cache 40 occur in set 48A as compared with sets 48B-D. This will result in frequent overwrites, since each set has a limited number of lines at which to cache a larger number of possible blocks from main memory 14. As illustrated in the second mapping 62, by applying the second index 68, the cached blocks are more uniformly distributed in the cache 40 among sets 48A, 48B, 48C, 48D. A greater hit rate is expected to be obtained using the second index 68, due to the more uniform distribution of blocks stored in the cache 40. Although each set 48A-D can only hold a limited number of blocks corresponding to the number of lines (ways) per set, applying the second index 68 recruits more sets within the cache 40, or at least more uniformly distributes cache access among the available sets 48A-D, so that a hit on each cache access is statistically more probable.

Figure 3:
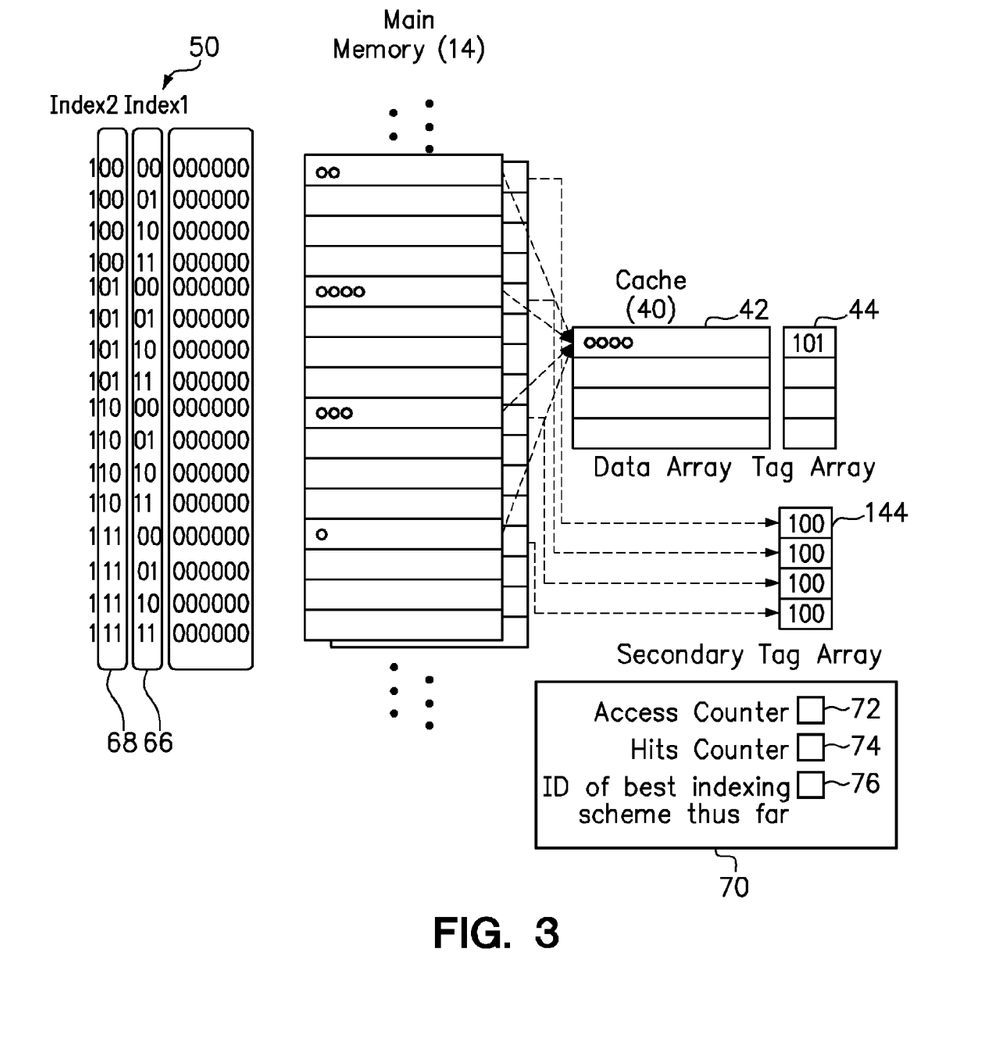
FIG. 3 is a schematic diagram illustrating the use of a secondary tag array to simultaneously evaluate the performance of an alternative index.

FIG. 3 is a schematic diagram illustrating the use of a secondary tag array 144 to simultaneously evaluate the performance of an alternative, candidate index. Here, the first index 66 is the currently selected index and the second index 68 is the candidate index currently under evaluation (there may be more than one candidate index to evaluate). A single data array 42 is provided. The first (currently selected) index 66 is used to index data to the data array 42 and to index the associated tag bits to a first ("primary") tag array 44 as part of running a software application. The second (candidate) index 68 is used only to index tag bits to a secondary tag array 144 for the purpose of evaluating the performance of the second index 68, but is not presently used to index or cache any data.

During an evaluation period, the performance of the first index 66 is determined by performing tag compares at the primary tag array 44 and the performance of the second index 68 is determined by performing tag compares at the secondary tag array 144. Note that in this example, the tag bits may be different for each index, since the index bits and tag bits must be selected from among the available columns of address bits; thus, the tag bits in the two tag arrays 44, 144 are different. The evaluation period is long enough to obtain a useful sample of the hits at each tag array 44, 144 in order to obtain a hit rate for each. The period may be a time period measured using a timer. Alternatively, the period may instead be the elapsing of a selected number of accesses (e.g. 100 million accesses) or clock cycles (e.g. 100 billion clock cycles). A counter section 70 includes a variety of counters for tracking cache statistics and associated performance rates. In this example, the counter section 70 includes an access counter 72 that tracks the number of times the cache 40 is accessed and a hit counter 74 for tracking the number of hits. The hit rate is a preferred metric for cache performance, and may be computed as the ratio of hits (hit counter 74) to cache accesses (access counter 72). At the conclusion of the time period, the hit rate or other performance metric for each index 66, 68 are compared and the index having the greatest hit rate is then selected. Sometimes, the index with the greatest hit rate is already the currently selected index. Other times, the candidate index has the greatest hit rate, in which case the system may perform a cache flush and switch to the candidate index having the greatest hit rate.

In FIG. 3, a single secondary tag array 144 is used by way of example. However, in a first alternative implementation more than one secondary index may be similarly evaluated using a like number of secondary tag arrays. For example, five different candidate indexes may each be simultaneously used to index to each of five respective secondary tag arrays. The hit rate for each index may be obtained using counters to track cache accesses and hits for each tag array, and the greatest of the five hit rates may be determined in order to dynamically switch to the best performing index.

In a second alternative implementation, a single secondary tag array may be used to sequentially evaluate each of a plurality of candidate indexes in successive time periods. Meanwhile, the currently selected index is used to index data to the data array and tag bits to the primary tag array.

In a third alternative implementation, no secondary tag array is included, and a single tag array is instead provided to evaluate a plurality of different indexes in succession. The currently selected index is used to index to both the data to the data array and the tag bits to the tag array, while performance metrics such as hit rate are obtained for the currently selected index. Each index may be used for long enough to acquire statistically useful performance data before moving to the next index. A cache flush must be performed before changing from one index to another. After acquiring the hit rates for all of the indexes, the index with the greatest hit rate may be selected and used for an extended period of time. At some later point in time, the indexes may again be evaluated to update which index is obtaining the greatest hit rate.

Figure 4:
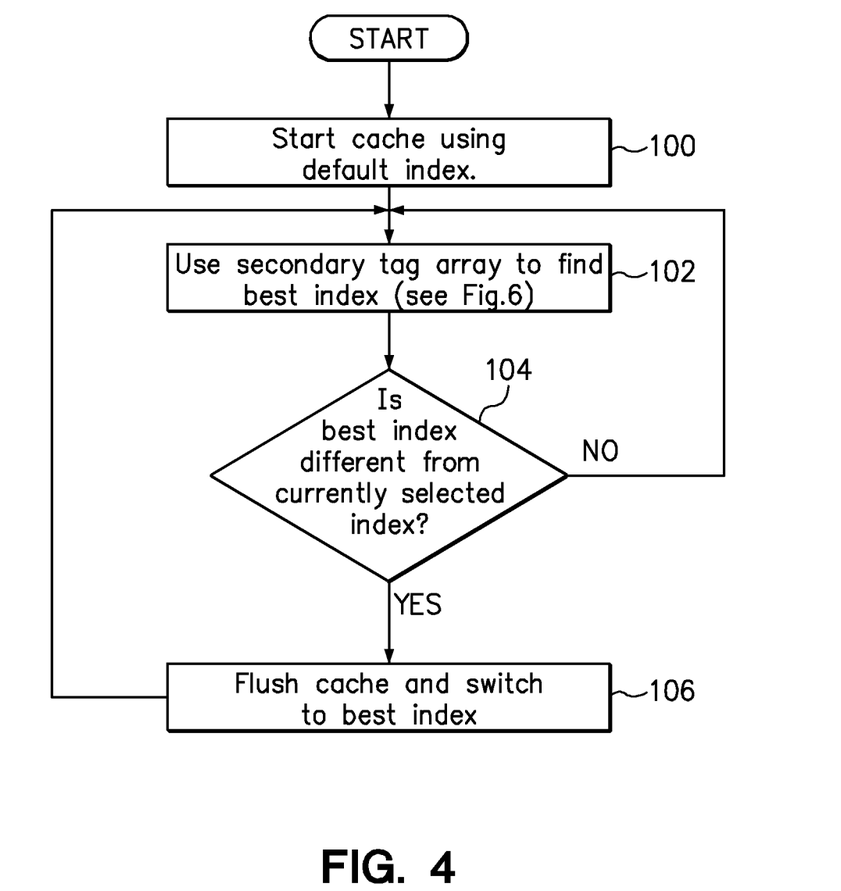
FIG. 4 is a flowchart generally outlining an example method for dynamically selecting an index for caching data in a computer memory system.

FIG. 4 is a flowchart generally outlining an example method for dynamically selecting an index for caching data in a computer memory system. In step 100, the cache is initiated using a default indexing scheme, which includes a default index. The default index may be pre-selected from one of a plurality of candidate indexes. The default index may be comprised of address bits at predefined bit positions. The index may have sufficient bit width to index to each of the available sets in the cache. In step 102, a secondary tag array is used to evaluate at least one candidate index other than the default index. (An example method of using a secondary tag array to evaluate one or more candidate index per step 102 is given in FIG. 6). Conditional step 104 is to compare the performance of the candidate index(es) to the default or currently selected index. If the best available index is different from the currently selected index, then the cache is flushed and the system dynamically switches to the best available index per step 106. Otherwise, the default or currently selected index is maintained. Since the best available index for a particular software process may change over time, step 102 is periodically repeated to evaluate one or more candidate indexes.

Figure 5:
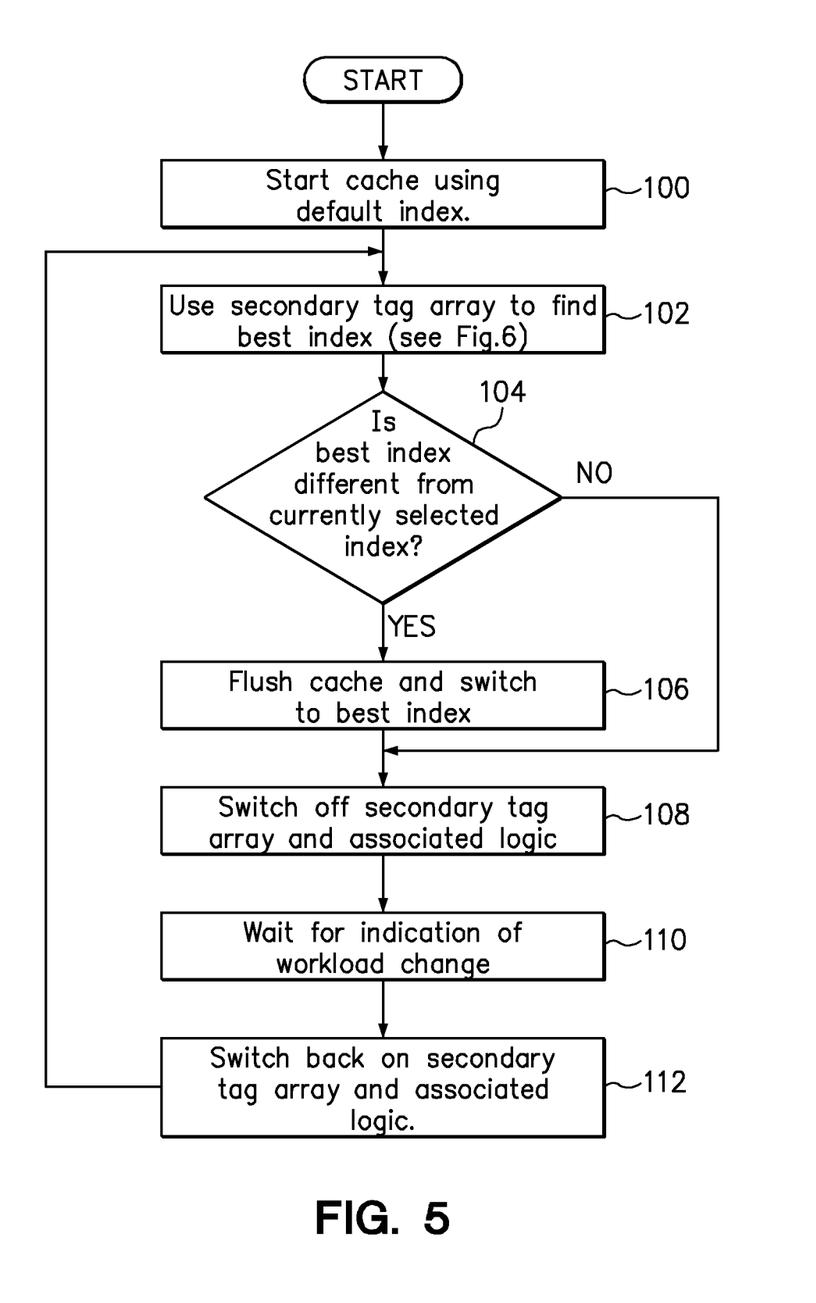
FIG. 5 is a flowchart generally outlining a reduced-power method for dynamically selecting an index.

FIG. 5 is a flowchart generally outlining a reduced-power method for dynamically selecting an index. Steps 100, 102, 104, and 106 are the same as in FIG. 4. However, after flushing the cache and switching to the best currently available index per step 106, the secondary tag array and associated control logic is temporarily switched off in step 108. Switching off the control logic may include, for example, gating a clock and placing the tag array in a low-power mode. Step 110 is to wait for an indication of workload change that would trigger a new search for the best performing index. Such an indication of workload change may include, for example, the passage of a time interval (e.g. several milliseconds or several days). The length of this time interval may depend on the dynamics of a particular software application. For example, particular software subroutines may have different patterns of caching that would affect the distribution of accesses in the cache. The software application or the operating system (OS) may provide some indication of a significant workload change. After the period of time has elapsed or other indication of a workload change has been provided in step 110, the secondary tag array may be switched back on per step 112.

Figure 6:
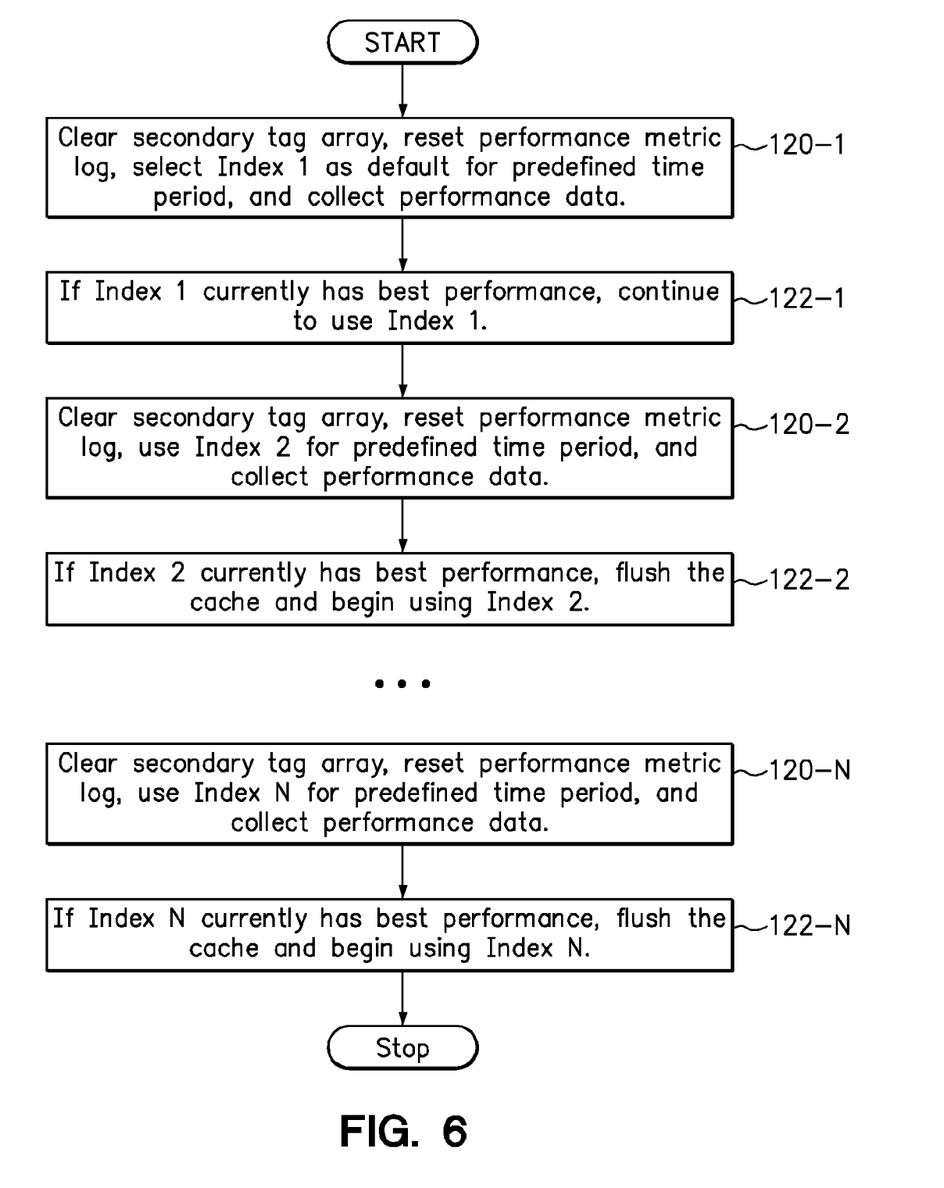
FIG. 6 is a flowchart further detailing an example method of using a secondary tag array to evaluate a plurality "N" candidate indexes.

FIG. 6 is a flowchart further detailing an example method of using a secondary tag array to evaluate a plurality "N" candidate indexes. Two steps 120 and 122 are repeated for each of N indexes. In step 120-1, a secondary tag array and a performance metric log are cleared. The performance metric log may include counters used in obtaining the hit rate(s) for one or more candidate index. A first candidate index (Index 1) is selected and, for a predefined evaluation period, performance data (e.g. a hit rate) is collected for Index 1. The evaluation period may be a predefined period of time or a predefined number of cache accesses or clock cycles. In steps 120-2 and 122-2, the first two steps are repeated using a second candidate index (Index 2), and so forth. In steps 120-N and 122-N, the first two steps are repeated using Index N. In this example method, each time a better performing index is identified, the cache is flushed and the better-performing index is selected for caching the data. However, recognizing that a cache flush consumes system resources, an alternative would be to cycle through all of the indexes from 1 to N, storing and updating the identify of the best performing index found as better performing indexes are identified, but waiting until the performance of every index 1 to N has been evaluated before performing a cache flush and switching to the best available index.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving performance of cache memory in a computer, comprising:

the computer running a software application that generates memory blocks to be stored in memory;

a cache controller indexing data bits of the memory blocks to a data array in the cache memory using a currently selected index;

the cache controller simultaneously indexing tag bits of the memory blocks to a primary tag array using the currently selected index and indexing tag bits of the memory blocks to a secondary tag array using a candidate index, and obtaining a hit rate at each of the primary and secondary tag arrays;

the cache controller sequentially evaluating a plurality of candidate indexes by indexing to the same secondary tag array with each candidate index for successive evaluation periods while measuring the hit rate in the secondary tag array; and the cache controller dynamically selecting the index that produces the greatest hit rate.

2. The method of claim 1, further comprising:

dynamically switching from a first index having a first hit rate to a second index having a second hit rate; and flushing the cache before switching to the second index.

3. The method of claim 1, further comprising:

dynamically switching between indexes by selectively increasing or decreasing the address bit positions used as the currently selected index.

4. A method for improving performance of cache memory in a computer, comprising:

the computer running a software application that generates memory blocks to be stored in memory;

a cache controller indexing data bits of the memory blocks to a data array in the cache memory using a currently selected index;

the cache controller simultaneously indexing tag bits of the memory blocks to a primary tag array using the currently selected index and indexing tag bits of the memory blocks to a secondary tag array using a candidate index, and obtaining a hit rate at each of the primary and secondary tag arrays;

the secondary tag array including a plurality of secondary tag arrays; and the cache controller including control logic for simultaneously evaluating a plurality of candidate indexes by indexing to each of the secondary tag arrays with a respective one of the plurality of candidate indexes over the same evaluation period while measuring the hit rate at each of the secondary tag arrays.

5. A method for improving performance of cache memory in a computer, comprising:

the computer running a software application that generates memory blocks to be stored in memory;

a cache controller indexing data bits of the memory blocks to a data array in the cache memory using a currently selected index;

the cache controller indexing the tag bits of the memory blocks to only one tag array according to a first index for a first period of time to obtain a hit rate associated with the first index; and the cache controller indexing the tag bits of the memory blocks to the only one tag array according to a second index for a second period of time to obtain a hit rate associated with the second index; and the cache controller dynamically selecting the index that produces the greatest hit rate.

\* \* \* \* \*